May 26, 1970   J. E. JOHNSON ET AL   3,514,091
CLAMPING DEVICE
Filed Jan. 13, 1967
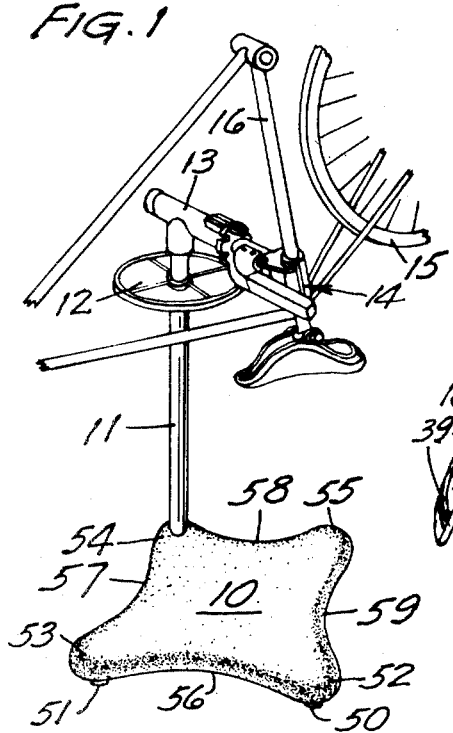
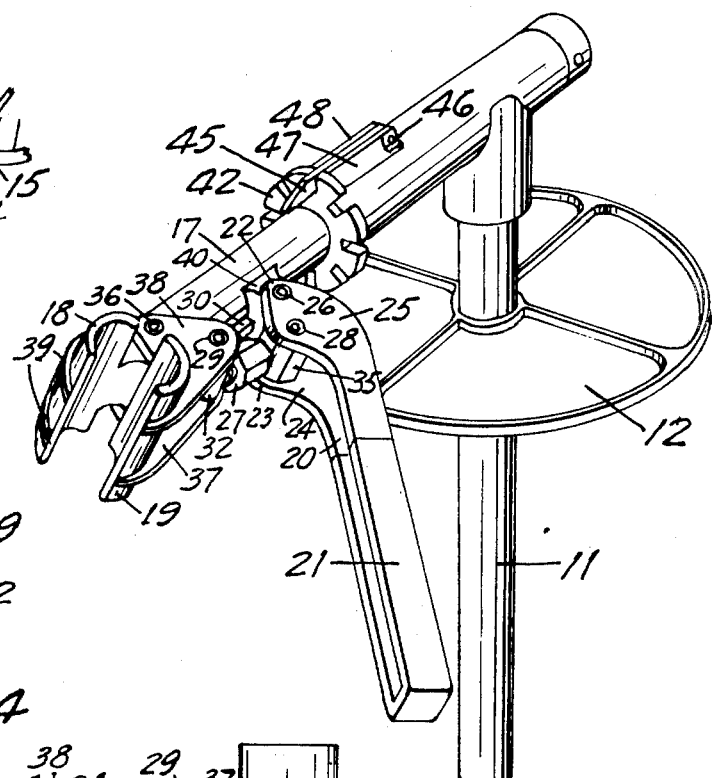
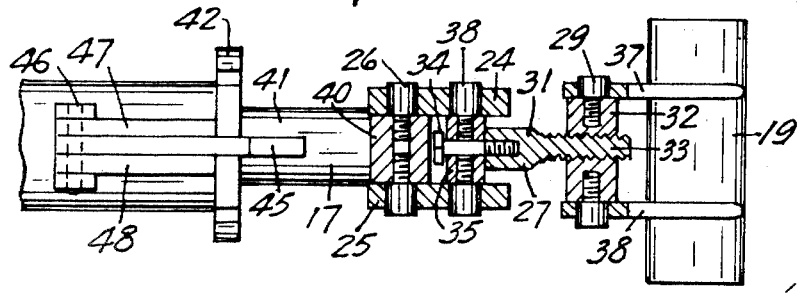
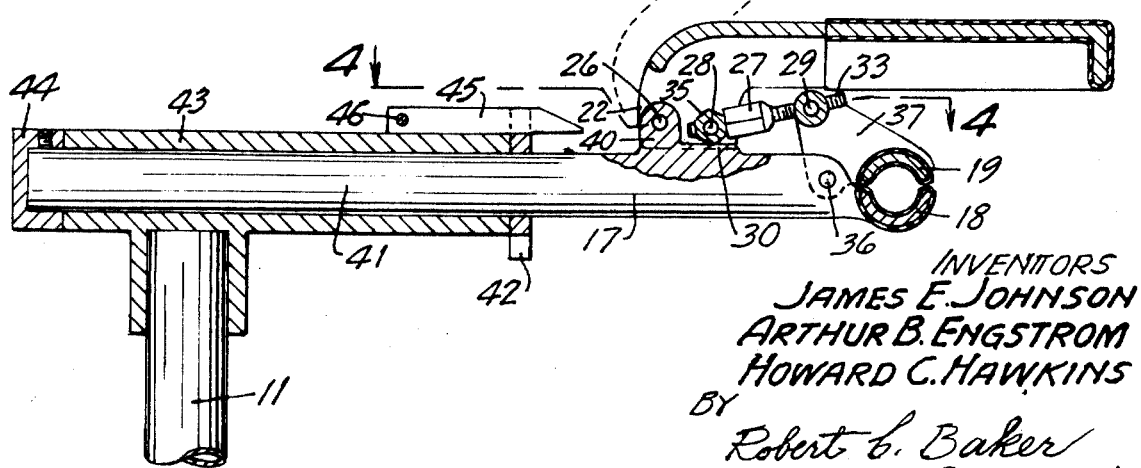
INVENTORS
JAMES E. JOHNSON
ARTHUR B. ENGSTROM
HOWARD C. HAWKINS
BY
Robert C. Baker
ATTORNEY United States Patent Office 3,514,091
Patented May 26, 1970

3,514,091
CLAMPING DEVICE
James E. Johnson, St. Paul, and Arthur B. Engstrom and Howard C. Hawkins, Maplewood, Minn. (both of 2250 White Bear Ave., St. Paul, Minn. 55109); said Johnson assignor to said Engstrom and said Hawkins
Filed Jan. 13, 1967, Ser. No. 609,213
Int. Cl. B25b 1/14, 5/12
U.S. Cl. 269—68
5 Claims

ABSTRACT OF THE DISCLOSURE

A lever-actuated clamping mechanism having two jaws, one of which is moved into clamping action with the other by a handle lever connected to it through a toggle link. The clamping action of the jaws is locked when the connection between the handle lever and toggle link passes through the dead center of a straight line between the fulcrum pivot attachment for the handle lever and the pivot attachment of the toggle link to the one jaw. The bite of the jaws of the clamping mechanism is preferably adjustable. A highly stable base standard is also provided, preferably but not always in combination with an upright and with other features to hold and permit adjustment of the orientation of a clamping mechanism.

---

This invention relates to a new clamping mechanism for holding articles, to new conveniently-used adjustable composite apparatus with a clamping mechanism normally a part thereof, and to a new highly stable base standard.

The composite apparatus of this invention is particularly useful as a holder for bicycles or other equipment while repairing the same, or while displaying the same either in an inanimate state or in an animated state involving demonstration of the various functions of different parts of the equipment.

As a separate piece of apparatus, the clamping mechanism of the invention may be mounted on various upright standards or arrangements of apparatus elements quite distinct from the preferred arrangement illustrated herein. It may be mounted on a standard or holder before or after being clamped upon an article or before or after an article is clamped by it. It is useful in a variety of ways. For example, it may even be used as a means to hold a large sheet of metal while tracing a pattern on the same. For such a use, the jaws of the clamp are of course preferably relatively flat-faced and are suitably equipped with friction pads.

The special features of the highly stable base standard of this invention make it useful not only in combination with a clamping mechanism, but also as a separate item on which equipment or display or demonstration apparatus and supporting elements may be affixed. Although base standards of almost infinite variety have heretofore been known, none is believed to possess the combination of special features imparting stability and ease of handling characteristic of the new base standard hereof.

The mechanical principles upon which the new clamping mechanism of this invention relies, if they ever have been known, and it is believed that they have not, are here utilized in a manner strange indeed to the art of sturdy holders or vise-type clamps. Heretofore, the art has looked upon the problem of providing a sturdy vise-type holder as one either requiring a complex arrangement of numerous parts and camming effects without passage of a toggle link control pivot through a dead center relationship for clamping action (as for example illustrated in such U.S. patents as No. 1,421,065 to Callan, and No. 1,417,025 to Bryan) or requiring a thread-actuated slow gripping means (as for example illustrated in U.S. Pat. No. 632,381 to Theadore). Such requirements of the prior art inevitably lead one away from achieving the simplified lever-actuated clamping mechanism of this invention.

The new relationship of elements taught herein provides great simplicity, reliability and utility for a lever-actuated clamping mechanism, and yet permits one to achieve extremely high clamping pressures, even on the order of 1,000 p.s.i. or more.

The new clamping mechanism comprises an elongated base member with a first jaw mounted thereon and a second jaw so mounted thereon as to be movable in the general lonigtudinal direction of the base member toward and away from clamping action with the first jaw. A handle lever is provided having a fulcrum end opposite an effort end with a resistance prominence intermediate those ends. This handle lever is suitably contoured so that its fulcrum end is laterally displaced slightly in the direction of the resistance prominence. The fulcrum end of the handle lever is pivotally mounted on the elongated base member in longitudinal spaced relationship to the second jaw of the clamping mechanism, but so as to be movable toward and away from the second jaw in an arc centered at the fulcrum pivot attachment. The resistance prominence of the handle lever faces toward the second jaw and is connected by a single toggle link to the second jaw. The connections at each end of the toggle link are pivot connections. The connection between one end of the toggle link and the resistance prominence of the handle lever is kown as a control pivot; and the connection between the other end of the toggle link and the second jaw is known as a jaw-link pivot. By such an arrangement, any force applied to the effort end of the handle lever to draw it toward the second jaw is transmitted through the resistance prominence and the toggle link to the second jaw and causes movement of the second jaw toward clamping action with the first jaw. Another feature of this mechanism is that the control pivot is adapted to be moved by the handle lever toward the elongated base member sufficiently to pass through the dead center of a straight line between the fulcrum pivotal mounting of the handle lever and the location of the jaw-link pivot after the second jaw is brought into true clamping action with the first jaw. Additionally, an abutment means is provided to stop the movement of the control pivot substantially immediately after it passes through the dead center relationship aforenoted. Preferably, this clamping mechanism is also provided with means to adjust the width of the bite between the first and second jaws; and in the preferred embodiment, the adjustment is accomplished by changing the length of the toggle link between the resistance prominence of the handle lever and the second jaw. Normally, the clamping mechanism is also provided with means to mount it on other elements of apparatus so as to form a combination including the clamping mechanism and a supporting structure.

The base standard of the invention is surprisingly low in weight in light of its high resistance to tilting action caused by laterally applied torquing moments. It comprises a unitary shroud of essentially uniformly thick cast metal supported by specially disposed leg members, with the skirt portion of the shroud specially contoured over the leg members and perimeter portions of the shroud between the leg members. The uppermost portion of the shroud is a convex portion over the rear leg member of the base standard; and in this portion a recess is provided which is adapted to receive and hold an upright standard and associated elements.

The invention will further be described by reference to a drawing made a part hereof wherein:

FIG. 1 is a schematic perspective view of the composite

3 apparatus of this invention with a bicycle, partially broken away, held by the jaws of the clamping mechanism;

FIG. 2 is an enlarged perspective view of the upper part of the composite apparatus of FIG. 1, with the bicycle removed, showing the jaws of the clamping mechanism in an open position;

FIG. 3 is a lateral sectional view through the clamping mechanism of the invention and supporting elements of apparatus closely associated with that mechanism; and FIG. 4 is a vertical sectional view taken on the irregular plane 4—4 through the view of FIG. 3, with some of the underlying elements of apparatus removed for clarity.

Broadly, the composite apparatus of the invention comprises a base standard 10, an upright standard 11 mounted on the base standard and extending vertically upward from it, a tray 12 for tools and the like mounted on the upright standard, a clamping mechanism holder 13, and a clamping mechanism numbered broadly as 14 in FIG. 1 in view of the compact nature of that figure. Also illustrated in FIG. 1 is a broken away view of a bicycle 15 with one of its frame bracing rods 16 gripped by the jaws of the clamping mechanism so that the bicycle is held in position for repair or for display.

The main parts of the clamping mechanism will now be described with particular reference to FIG. 2, 3 and 4. It includes an elongated base member 17, preferably in the form of a rod which is suitably cylindrical but may be square, if desired. Mounted on base 17 is a first jaw 18; this jaw may project from base 17 in a direction other than off the end of that elongated base. Preferably, jaw 18 is fixed to base 17 and is integral therewith in the sense that it comprises one part with the base. It may, however, be so mounted on the base as to be adjustable.

Also connected to the base member 17 is a second jaw 19. This second jaw 19 is mounted or connected to the base 17 so as to be movable in the longitudinal direction of the elongated base 17 toward and away from clamping action with the first jaw 18. Preferably the mounting of jaw 19 on base 17 is a hinged mounting, or a mounting permitting pivot of jaw 19 toward the first jaw 18 for clamping action and away from that jaw for release of clamping action. Alternately, however, the mounting of jaw 19 on base 17 may be a slide mounting such as one formed by a slot and pin arrangement.

Next, this clamping mechanism comprises a handle lever 20, which is illustrated in the drawing as a folded thickness of metal having a plastic handle grip 21 at its effort or hand-grip end. The end of the handle lever opposite its effort end 21 is known as its fulcrum end 22; and between the fulcrum end 22 and the effort end 21 is a resistance prominence 23. Suitably the resistance prominence 23 and the fulcrum end 22 of the handle lever 20 are so shaped as to comprise a bifurcated part or two flanged-arm parts 24 and 25. The handle lever is pivotally mounted at its fulcrum end 22 on the elongated base member 17, suitably on a mounting stub 40 projecting from said elongated base member 17. This fulcrum pivotal connection is broadly designated as pivot 26 in the drawing. Importantly, the handle lever 20 is pivotally mounted on base 17 in longitudinally spaced relationship to the second jaw for movement toward and away from that second jaw. The resistance prominence 23 of the handle lever also faces toward the second jaw 19.

A single toggle link, broadly designated as 27, operatively links the resistance prominence 23 of the handle lever to the second jaw 19 by pivot connections 28 and 29. The pivot connection 28 at one end of the toggle link 27 to the resistance prominence 23 is termed a control pivot 28, whereas the pivot connection 29 at the other end of the toggle link 27 to the second jaw 19 is termed a jaw-link pivot 29. The result of this linkage is such that force applied to the effort end 21 of the handle lever 20 to draw it toward the second jaw 19 is transmitted through the resistance prominence 23 of the handle lever 20 and then through the toggle link 27 to the second jaw 19, and

4 causes movement of the second jaw 19 toward clamping action with the first jaw 18.

Referring particularly to FIG. 3, it will be seen that the movement of the handle lever 20 toward the second jaw 19 causes the control pivot 28 to be moved by the handle lever 20 toward the base 17 sufficiently to pass through the dead center of a straight line between the fulcrum pivotal mounting 26 of the handle lever and the location of the jaw-link pivot 29 after the second jaw 19 is brought into true clamping action with the first jaw 18.

An abutment means, suitably a ribbed part 30 on the elongated base 17, serves to stop movement of the control pivot 28 substantially immediately after that control pivot passes through the dead center aforenoted, i.e., the dead center of a straight line between the fulcrum pivotal mounting 26 and the location of said jaw-link pivot 29 after closing the second jaw.

Preferably the width of the bite between the first and second jaws 18 and 19 is adjustable, normally by cooperatively threaded parts; and while adjustment may be accomplished in a variety of ways, including, for example, threaded adjustment of the tilt of first jaw 18 at its mounting to base 17, or threaded adjustment of still other parts of the apparatus than those aforementioned or specifically illustrated, it is preferably accomplished by varying the length of the toggle link 27 between the control pivot 28 and jaw-link pivot 29. The showing of FIG. 4 perhaps most clearly illustrates the important features for this adjustment of the toggle length. As there illustrated, a single set of cooperatively threaded parts are solely used to effect the adjustment. One of those parts 31 is axially rotatable about the axis of the toggle link 27, and in fact preferably forms a part of the length of the single toggle link. It is shown in FIG. 4 as comprising essentially the full length of the toggle link between control pivot 28 and jaw-link pivot 29. The other of those cooperatively threaded parts is illustrated in FIG. 4 as an enlarged pivot pin 32 for jaw-link pivot 29. Pivot pin 32 has a threaded hole extending transversely therethrough and adapted to receive the threaded end 33 of threaded part 31. The enlarged pivot pin 32 is nonrotatable about the axis of the toggle link. Axial rotation of part 31 about the toggle axis moves it through the screw threads of the hole through enlarged pivot pin 32. This action tends to either increase or decrease the effective length of the single toggle link 27.

To be recognized is the fact that axially rotatable part 31 of the single toggle link is mounted in a longitudinally-locked manner to permit rotation of it and cooperative action between its threads and the threads of the threaded part 32. The longitudinal locking of the rotatable part 31 is suitably accomplished by fixing a bolt or flanged pin 34 through a bore of control pivot pin 35 of the control pivot 26. The bore in pivot pin 35 is large enough to permit free rotation of bolt 34 in it. Bolt 34 extends through it and is fixed to the end of axially rotatable part 31. Such mounting for the axially rotatable part 31 on the control pivot pin 35 effectively locks that part against longitudinal movement in relation to the toggle link 27, and yet allows axial rotation of it for cooperative action of its threaded end 33 with the threads of the enlarged pivot pin 32 at the jaw-link pivot 29. Thus axial rotation of the toggle link part 31 through the part 32 effectively changes the length of the single toggle link, either increasing or decreasing it, depending upon the direction of rotation of part 31. Simultaneously, by changing the length of the toggle link 27, the position of the jaw-link pivot 29 for the second jaw 19 is adjusted to be either further away or closer to control pivot 28. As jaw-link pivot 29 is moved further away from control pivot 28, the bite of the jaws 18 and 19 is narrowed. In effect, the bite of the jaws becomes larger as the length of the single toggle link 27 between its pivot connections 28 and 29 is shortened, and smaller as the length of the single toggle link 27 between its pivot connections 28 and 29 is increased.

Not only is the mounting for the second jaw 19 on the base 17 preferably a pivot mounting as broadly illustrated at 36 in the drawing, but also the configuration of the second jaw is preferably such that is has flanged ears 37 and 38 extending behind the second jaw in a direction aligned with the elongated base member. These flanged ears 37 and 38 also extend in a direction spaced outwardly from the base member when the second jaw 19 is in the clamped position. Further, the jaw-link pivot 29 preferably is located in the outer part of the flanged ears 37 and 38 away from the base member 17. These flanged ears not only provide a desirable mounting for the jaw-link pivot 29, but also provide reinforcement for the bite surface area of the jaw 19 itself. Analogously, reinforcement for jaw 18 may suitably be provided by ribs 39 and 39 at its back.

As illustrated in FIGS. 2 and 3, the fulcrum pivotal mounting 27 for the handle lever 20 is accomplished to elongated base 17 at a bridge rib or lug 40 affixed to the elongated base 17 so that the fulcrum pivot 26 is spaced farther from the base 17 than the control pivot 28 when the jaws are placed in clamping position. Also as illustrated, the pins for all pivots are preferably approximately transverse to the length of elongated base 17.

The clamping mechanism as described is also usually provided with a rod-like mounting projection 41 (see FIG. 3) extending as a continuation of its elongated base member 17. This mounting projection 41 preferably extends from the elongated base at a position beyond or away from the fulcrum pivotal mounting 26 of the handle lever and in a direction away from the first 18 and second 19 jaws of the clamping mechanism. Rigidly fixed on the elongated base member, suitably along the part thereof comprising the rod-like mounting projection, is a radially notched annular flange 42. This annular flange is preferably axially fixed on the elongated base member in a position spaced sufficiently from the terminal end of the rod-like mounting projection 41 of the elongated base member 17 to permit insertion of the rod-like mounting projection in a holder 43 for mounting purposes. Insertion of the rod-like mounting projection 41 in the holder 43 is suitably accomplished so that the annular flange 42 abuts against the opening of the holder 43 after the mounting projection 41 is inserted in the holder 43. It is to be stressed at this point that the clamping mechanism aforedescribed including the elongated base member and annular flange 42 are conveniently removable from the holder 43 as a unit. Thus the clamping mechanism may be clamped upon an article, and then the article and clamping mechanism together may be moved about or placed in a holder through the medium of the mounting projection 41 to permit repair of the article or the like.

Holder 43 is preferably a sleeve cylinder suitably having a block or plug 44 at one end thereof. Also, the rod-like mounting projection 41 is preferably cylindrical for fit into the sleeve cylinder 43.

On sleeve cylinder holder 43 is suitably mounted a locking lever 45. This locking lever is preferably pivotally mounted at a pin 46 extending between a pair of flanged shaped lugs 47 and 48 (see FIG. 2) on the sleeve cylinder 43. These flanged-shaped lugs are fixed longitudinally on the outer surface of the sleeve cylinder 43, preferably on the upper outer surface thereof, and terminate at the open end of that sleeve cylinder adapted to receive the rod-like mounting projection 41. The locking lever 45 is of sufficiently greater length than the lugs and of a size to fit into notches of the notched annular flange 42 on the elongated base member 17. By removably fixing the locking lever 45 in different notches of the annular flange 42, the relative axial orientation of the clamping mechanism may be changed to any selected axial position at the sleeve cylinder holder 43. This in turn permits arrangement of a clamped object in the most convenient position for work on it.

As more particularly illustrated in FIG. 1, the sleeve cylinder 43 is horizontally mounted to an upright standard 11 and the upright standard 11 is supported or held in position on a base standard 10.

Major features of the base standard of this invention will now be described. These features are particularly significant in permitting a relatively low total weight for the base standard in combination with extraordinary stability. Illustratively, the base standard is essentially only a unitary shroud of cast metal supported by legs. Only front leg 50 and left leg 51 are illustrated in FIG. 1 of the drawing; but the right leg and rear leg as well as the front and left leg are all preferably adjustable in height and comprise rubber feet or friction feet. The shroud 10 may be adjusted so that it rests on a floor, or a negligible amount above it, or as much as 2 or 3 or more inches from the floor, if desired. Instead of adjustable rubber feet, or in addition thereto, casters may be provided in the approximate location of the rubber feet to permit convenient mobility.

The shroud 10 is a unitary shroud of essentially uniformly thick cast metal. Supporting it is front leg member 50, a rear leg member (not shown in the drawing) directly behind said front leg member and in a position approximately under the position of the mounting post 11 in FIG. 1 of the drawing, plus a right leg member (not shown in the drawing) under the shroud at numeral 55 in the drawing, and a left leg member 51. The right and left leg 51 members are disposed a distance from each other approximately twice as great as the distance of the front leg member 50 from a straight line connecting the left 51 and right leg members. Each of the right, left and front leg members are in fact approximately equally distant from the point intersection of a straight line between the right and left leg members with a straight line between the front and rear leg members. The rear leg member is no farther distant from that point intersection than approximately three-fifths the distance of the front leg member from that point intersection. The shroud 10 is supported by the leg members and curves over the leg members in a convex skirt curve 52, 53, 54 and 55 at each of the leg members and at all points therebetween. Actually, the skirt portion of the shroud extending between adjacent pairs of legs (e.g., between legs 50 and 51; leg 51 and the leg under the shroud at 54; the leg under the shroud at 54 and the leg under the shroud at 55; and the leg under the shroud at 55 and leg 50) is withdrawn from a vertical-view straight line between the adjacent leg members. In other words, as viewed from the vertical looking down at the shroud, the skirt portion between adjacent leg members assumes a vertical view concave form, as at 56, 57, 58 and 59 in the drawing. However, the bottom portion of the skirt between adjacent leg members and the bottom portion of the skirt at each leg member terminates in the same plane. Further the uppermost portion of the convex curve of the shroud over the front, right and left leg members is approximately equal in height and is approximately one-half the height of the uppermost curve portion 54 of the shroud over the rear leg member. In fact, the shroud in all areas except toward and at curved portion 54 over the rear leg member is approximately equal in height. It curves upwardly toward the peak height over the rear leg member at 54 in the drawing. The portion of the shroud extending over the point intersection of a straight line between the right and left legs with a line between front and rear leg members is characterized as being at least as high as the portion covering the right and left and front leg members, but no higher than approximately five-eighths the height of the uppermost curved portion over the rear leg member. A recess is provided in the uppermost rear curved portion of the shroud to receive and hold an upright standard 11 therein against tilting even under high laterally-applied torquing moments.

Illustratively, the dimensions of a suitable shroud of cast gray iron heighing about 55 pounds are about 33 inches from the left to the right extremities over the left and right legs, and about 26 inches from the front to the rear extremities over the front and rear legs. The legs are recessed underneath such a shroud about 1 or 2 inches, but no more. The point intersection of a line between the front and rear legs with a line between the left and right legs is suitably about 15 inches from each of the front, left and right legs. Legs consisting of adjustable rubber feet of about 1 inch in diameter have been found very suitable. The height of the shroud over the front and left and right leg members is suitably only about 2 inches, and over the rear leg member, is suitably about 4 inches, with the height at the point intersection between the front and rear and left and right legs being at about 2½ inches. The distance between opposite vertical view concave curvatures of the shroud, i.e., between concave curvatures 56 and 58 and concave curvatures 57 and 59, is suitably about 17½ inches in the specific shroud illustrated. Thus it will be evident that the distance between opposite concave curvatures of the shroud is no more than about five-eighths the distance between the left and right leg members. The shroud is essentially uniform in thickness as aforenoted, and is no more than about ⅜ inch thick in this illustrative embodiment.

It will be recognized that changes may be made in the details of the apparatus illustrated, such as for example, cam action to achieve change of the bite of the jaws, or variation in the shape of various parts, or addition of a plastic coating or other pad to the jaws, etc., without departing from the essential features of the invention, as comprehended by the appended claims and construed with equivalents to which they are entitled.

That which is claimed is:

1. A clamping mechanism comprising an elongated base member, a first padded jaw mounted on said base member, a second padded jaw mounted on said base member so as to be movable in the general longitudinal direction of said base member toward and away from clamping action with said first jaw, a handle lever having a fulcrum end opposite an effort end with a resistance prominence intermediate said ends, said handle lever being pivotally mounted at its fulcrum end on said elongated base member in longitudinally spaced relationship to said second jaw for movement toward and away from said second jaw and with the resistance prominence of said handle lever facing toward said second jaw, a single toggle link which is variable in length and which is operatively linked to said resistance prominence of said handle lever and to said second jaw by pivot connections, the pivot connection at one end of said toggle link to said resistance prominence being a control pivot and the pivot connection at the other end of said toggle link to said second jaw being a jaw-link pivot, whereby force applied to the effort end of said handle lever to draw it toward said second jaw is transmitted through said resistance prominence and said toggle link to said second jaw to effect movement of said second jaw toward clamping action with said first jaw, said control pivot being adapted to be moved by said handle lever toward said base member sufficiently to pass through the dead center of a straight line between said fulcrum pivotal mounting of said handle lever and the location of said jaw-link pivot after said second jaw is brought into true clamping action with said first jaw, abutment means to stop movement of said control pivot substantially immediately after it passes through said dead center, and a rod-like mounting projection extending as a continuation of said elongated base member beyond the fulcrum pivotal mounting of said handle lever in a direction away from said first and second jaws.

2. The clamping mechanism of claim 1, wherein the single link is variable in length by means comprising cooperatively threaded parts.

3. The clamping mechanism of claim 1 in which the mounting of the second jaw on the base member comprises a pivot connection.

4. The clamping mechanism of claim 3 in which the second jaw has flanged ears extending behind the same in a direction substantially aligned with said elongated base member and in a direction spaced outwardly from said base member when said second jaw is in clamping position, and in which the jaw-link pivot is located in an outer part of said flanged ears away from said base member.

5. The clamping mechanism of claim 1 having a radially-notched annular flange axially fixed on said elongated base member, said annular flange being spaced sufficiently from the terminal end of the rod-like mounting projection of said elongated base member to permit insertion of said rod-like mounting projection up to said annular flange in a holder for holding said clamping mechanism.

References Cited

UNITED STATES PATENTS

| | | | |
|---|---|---|---|
| 605,429 | 6/1898 | Howard | 211—22 |
| 632,381 | 9/1899 | Theadore | 269—71 |
| 1,421,065 | 6/1922 | Callan | 269—228 |
| 1,952,605 | 3/1934 | Pearson | 269—228 X |
| 2,106,525 | 1/1938 | Henry | 269—70 |
| 2,188,433 | 1/1940 | Friese | 269—71 |
| 2,333,071 | 10/1943 | Jannisse | 269—239 X |
| 2,823,567 | 2/1958 | Pothier | 269—71 |

FOREIGN PATENTS 1,247,112   10/1960   France.

ANDREW R. JUHASZ, Primary Examiner

L. GILDEN, Assistant Examiner

U.S. Cl. X.R.

211—22; 269—228, 238